UNITED STATES PATENT OFFICE.

HENRY BRYDA, OF BLACKSTONE, MASSACHUSETTS.

PROCESS OF PRODUCING COPPER ALLOYS.

1,095,078.　　　　　Specification of Letters Patent.　　Patented Apr. 28, 1914.

No Drawing.　　　Application filed April 14, 1913.　Serial No. 761,116.

*To all whom it may concern:*

Be it known that I, HENRY BRYDA, a citizen of the United States, residing at Blackstone, in the county of Worcester and State of Massachusetts, have invented certain new and useful Improvements in Processes of Producing Copper Alloys; and I do declare the following to be a full, clear, and exact description of the invention, such as will enable others skilled in the art to which it appertains to make and use the same.

The present invention relates to a method of producing a copper alloy, which for certain purposes may be used as a substitute for gold.

The object of the invention is to provide a process whereby an inexpensive substitute for gold can be produced, which material will not change color or corrode or tarnish when exposed to ordinary atmospheric influences which will not rust, which retains brilliancy for a long period of time without frequently polishing, and which may be used for the production of jewelry or as a base metal for making table knives, forks, spoons and the like.

In carrying out my process I preferably proceed as follows: 16 ounces of copper are melted, and while molten a suitable quantity of tin or zinc, preferably about 1½ ounces, is added thereto, and the mixture agitated until the copper thoroughly alloys with the tin or zinc, after which 1½ ounces of quick lime are added and the material constantly agitated for 3 minutes or more, thereafter 1 ounce of "tartar of commerce" (crude potassium acid tartrate) is added and the mixture agitated for 2 minutes or more, after this 1 ounce of magnesia (magnesium oxid) is added, and the mixture again agitated for 3 or 4 minutes, after this ½ ounce of sal ammoniac (ammonium chlorid) is added, and the entire mixture is agitated steadily for ½ to ¾ of an hour, more or less.

While in the above example I have stated the proportions in the form of ounces, it is obvious that pounds or tons or any other suitable unit of weight may be employed, and the proportions above stated are given for the purpose of illustration only, and the invention is not confined to these particular proportions, since the proportions may vary more or less, the proportions of copper and tin being varied to produce alloys of somewhat different hardness, color, and other properties, and the proportions of the other ingredients varying according to the degree of purity of the copper and tin employed.

When the ingredients have all been thoroughly mixed the crucible or melting pot is covered and allowed to remain untouched from thirty to forty minutes which will permit certain impurities to sink to the bottom. It is important that when the sal ammoniac is added that the operator does not inhale the black smoke which is given off from the mixture, since this smoke is injurious to the health of the operator. The quick lime is preferably employed in the form of a fine powder, and after mixing this with the alloy, the color of the mass changes from coppery red to golden yellow. The so commingled ingredients are then poured into a suitable mold which is composed of any suitable material such as plaster of Paris, black lead, carbon, iron or any other mold other than one made from loam or earth.

I claim as my invention:

1. A process of producing a copper alloy, which consists in melting copper, and adding successively thereto, while stirring, tin, quick lime, tartar, magnesia, and sal ammoniac.

2. A process of producing a copper alloy, which consists in melting 16 parts of copper, then adding successively the following substances: 1½ parts of tin, 1½ parts of quick lime, 1 part of tartar, 1 part of magnesia; and agitating the mixture after each addition of material.

3. A process of producing a copper alloy which consists in melting copper, then adding to the melted copper a small quantity of tin, then agitating the mixture so formed until the copper and tin are thoroughly combined, then adding quick lime and agitating the mixture, then adding tartar of commerce and agitating the mixture so formed, then adding magnesia and agitating the mixture after said addition, then adding sal ammoniac and agitating the mixture for from thirty to forty-five minutes more or less, then allowing this mixture to stand for a predetermined time and then pouring the mixture so formed into suitable molds.

In testimony whereof I have hereunto set my hand in presence of two subscribing witnesses.

HENRY BRYDA.

Witnesses:
FRANK W. MCCOVEY,
WALTER BRYDA.